(12) United States Patent
Woitsch et al.

(10) Patent No.: US 9,221,410 B2
(45) Date of Patent: Dec. 29, 2015

(54) VEHICLE HAVING ELECTRICAL CONSUMERS INTEGRATED WITH A PHYSICAL ONBOARD POWER SUPPLY SYSTEM

(71) Applicant: Bayerische Motoren Werke Aktiengesellschaft, Munich (DE)

(72) Inventors: Susanne Woitsch, Augsburg (DE); Joachim Froeschl, Herrsching (DE); Guido Boehm, Geltendorf (DE); Alfons Brunner, Woerth a. d. Isar (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/504,677

(22) Filed: Oct. 2, 2014

(65) Prior Publication Data

US 2015/0019077 A1 Jan. 15, 2015

Related U.S. Application Data

(63) Continuation of application No. PCT/EP2013/056693, filed on Mar. 28, 2013.

(30) Foreign Application Priority Data

Apr. 3, 2012 (DE) .......................... 10 2012 205 415

(51) Int. Cl.
*B60R 16/03* (2006.01)
*H02J 1/14* (2006.01)

(52) U.S. Cl.
CPC . *B60R 16/03* (2013.01); *H02J 1/14* (2013.01); *Y02T 10/92* (2013.01)

(58) Field of Classification Search
CPC ..... B60L 11/12; B60L 15/20; B60L 2200/12; B60L 2240/423; B60L 2240/547; B60L 2240/549; B60L 2250/16; B60K 2350/1092; B60K 2350/2008; B60K 2350/2056; B60K 2350/206; B60K 35/00; B60K 37/02; B60R 16/03; H02J 1/14; Y02T 10/92
See application file for complete search history.

(56) References Cited

U.S. PATENT DOCUMENTS 5,315,287 A 5/1994 Sol
6,119,060 A * 9/2000 Takayama et al. .............. 701/36
(Continued)

FOREIGN PATENT DOCUMENTS

DE 34 02 374 C2 8/1985
DE 42 41 012 A1 6/1994
(Continued)

OTHER PUBLICATIONS

"US Proposed Examiner_s Amendment"; authored by: Jonathan Lindsay; retrieved: Jul. 15, 2015.*
(Continued)

*Primary Examiner* — James Trammell
*Assistant Examiner* — James E Stroud
(74) *Attorney, Agent, or Firm* — Crowell & Moring LLP

(57) ABSTRACT

A vehicle with an internal combustion engine, with a physical onboard power supply system and with at least one electrical energy source, wherein electrical consumers are integrated in the physical onboard power supply system and the physical onboard power supply system comprises a switchable terminal 15, wherein, when the terminal 15 is actuated and the internal combustion engine is switched off or when the internal combustion engine is running at a low rotational speed, each of the electrical consumers is assignable by a control device to either a first group of electrical consumers or a second group of electrical consumers, an electrical consumer of the first group is at least partly able to be switched on and off by a user, an electrical consumer of the second group cannot be switched by the user, and an electrical consumer which is switched on at least partly can be supplied with electrical power from the at least one electrical energy source.

3 Claims, 1 Drawing Sheet

(56) References Cited

U.S. PATENT DOCUMENTS

| | | |
|---|---|---|
| 7,615,879 B2 | 11/2009 | Przywecki |
| 2004/0212582 A1* | 10/2004 | Thielemans et al. .......... 345/107 |
| 2010/0084653 A1* | 4/2010 | Yamazaki et al. .............. 257/43 |
| 2012/0188068 A1* | 7/2012 | Hanna et al. .................. 340/441 |
| 2014/0198384 A1* | 7/2014 | Amimori ................. 359/486.01 |

FOREIGN PATENT DOCUMENTS

| | | |
|---|---|---|
| DE | 199 60 079 A1 | 6/2000 |
| DE | 199 52 112 A1 | 6/2001 |
| DE | 10 2004 052 905 A1 | 5/2006 |
| DE | 10 2005 046 340 A1 | 4/2007 |
| DE | 10 2005 049 440 A1 | 4/2007 |
| DE | 10 2005 060 129 A1 | 6/2007 |
| DE | 10 2010 029 971 A1 | 12/2011 |
| EP | 0 601 300 A1 | 6/1994 |
| EP | 1 361 640 B1 | 2/2008 |
| EP | 2 293 405 A1 | 3/2011 |
| GB | 2 360 644 A | 9/2001 |

OTHER PUBLICATIONS

International Search Report dated Jun. 13, 2013 (Two (2) pages).
German Search Report dated Jan. 7, 2013, 2013 (Six (6) pages).

* cited by examiner

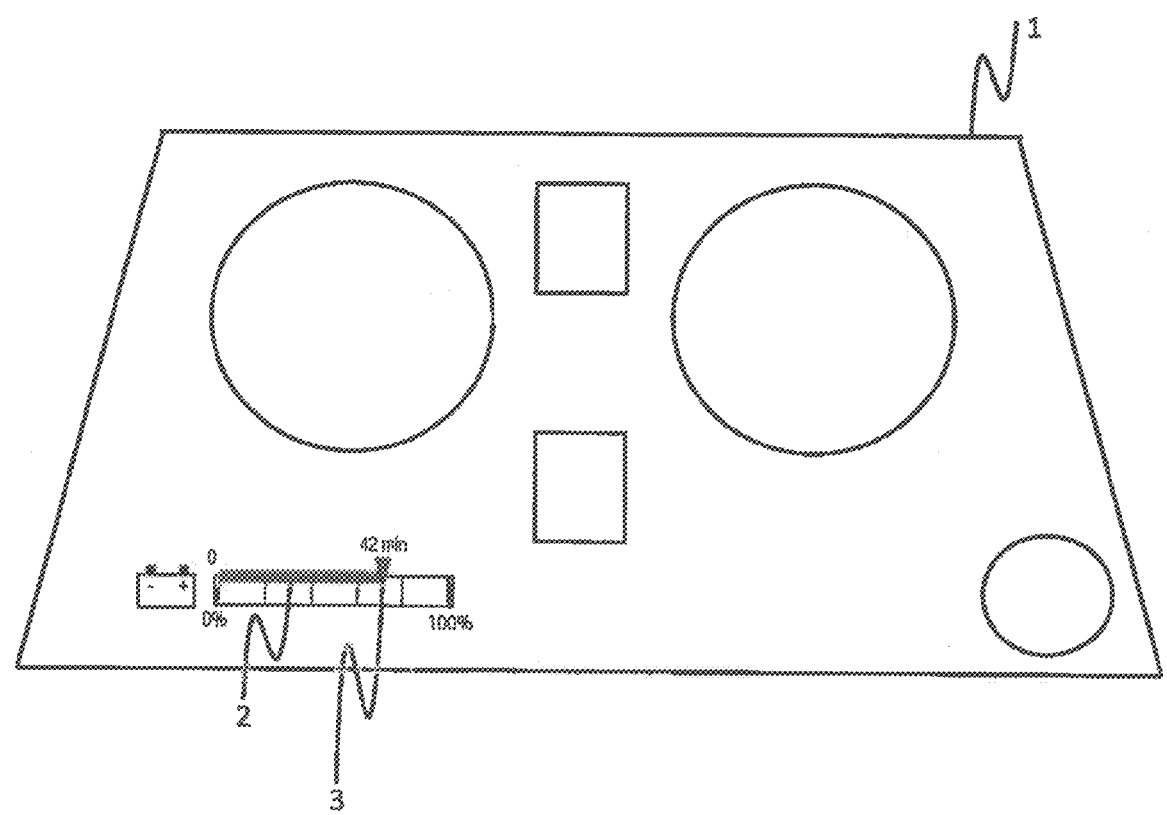

VEHICLE HAVING ELECTRICAL CONSUMERS INTEGRATED WITH A PHYSICAL ONBOARD POWER SUPPLY SYSTEM

CROSS REFERENCE TO RELATED APPLICATIONS

This application is a continuation of PCT International Application No. PCT/EP20131/056693, filed Mar. 28, 2013, which claims priority under 35 U.S.C. §119 from German Patent Application No. DE 10 2012 205 415.4, filed Apr. 3, 2012, the entire disclosures of which are herein expressly incorporated by reference.

BACKGROUND AND SUMMARY OF THE INVENTION

The invention relates to a vehicle with an internal combustion engine, with a physical onboard power supply system and with at least one electrical energy source, wherein electrical consumers are integrated in the physical onboard power supply system.

A vehicle electrical onboard power supply system is usually configured according to the prior art such that energy sources in the vehicle, such as a generator and a battery, for example, can cover the requirement on electrical power by energy sinks.

However, document EP 1 361 640 B1 describes that, owing to the multiplicity of electrical consumers in a modern vehicle onboard power supply system, the operation of such consumers when the engine is switched off and the generator is stationary often leads to a discharged battery.

Document EP 1 361 640 B1 proposes temporarily disconnecting the battery from the onboard power supply system and, optionally, maintaining an electrical connection to the generator in order to charge the battery.

It is an object of the invention to describe an improved vehicle with an internal combustion engine, with a physical onboard power supply system and with at least one electrical energy source, wherein electrical consumers are integrated in the physical onboard power supply system.

This object is achieved by a vehicle as claimed in claim 1. Advantageous embodiments and developments of the invention emerge from the dependent claims.

According to the invention, when the internal combustion engine is switched off or when the internal combustion engine is running at a low rotational speed, each of the electrical consumers is assignable by a control device to either a first group of electrical consumers or a second group of electrical consumers. An electrical consumer of the first group is at least partly able to be switched on and off by a user, while an electrical consumer of the second group cannot be switched by a user. An electrical consumer which is switched on, at least partly, can be supplied with electrical power from the at least one electrical energy source.

This means that if the internal combustion engine is switched off or is running at a low rotational speed, an electrical consumer is either utilizable or not utilizable by a user of the vehicle. A utilizable consumer, if it is actually utilized, can be supplied with electrical power from an electrical energy source of the onboard power supply system. This state is referred to as "in-cab state".

Furthermore, it is advantageous if the assignment of each one of the electrical consumers to either of the two groups takes place on a time-dependent basis.

In other words, an electrical consumer in the "in-cab state" can be utilized, at an instant of the "in-cab state" if the electrical consumer was not utilizable before this instant, or cannot be utilized by the user if said electrical consumer was utilizable before said instant.

The utilization of an electrical consumer can be determined centrally or de-centrally in the vehicle by a control unit. This depends on the availability of energy in the onboard power supply system at the instant in question and on the energy requirement of the consumers in question. In the event of a shortfall in the energy requirement of the electrical consumers, electrical consumers can be utilized according to the technical relevance or necessity thereof. By way of example, heating power of a heated seat can be reduced in favor of increasing the energy supplied to a car radio.

According to a preferred embodiment of the invention, the assignment of an electrical consumer to one of the two groups can be displayed to the user of the vehicle.

Thus, the user can recognize, for example via a display, that a particular electrical consumer is utilizable or not utilizable at a particular instant of the "in-cab state".

This means, according to this embodiment, that a user can directly recognize whether a particular consumer is utilizable or not utilizable at the instant in question.

Furthermore, an energy state of the at least one electrical energy source or the energy sources can be displayed to the user on a time-dependent basis.

Thus, the user can therefore recognize, for example via a display, which energy state the at least one electrical energy source or the network of a plurality of energy sources occupies in the "in-cab state."

According to another variant of the invention, the energy state of the at least one electrical energy source or the energy sources can be displayed to the user in the form of a predicted duration at an instant, wherein the prediction is based on the power supplied to the at least partly switched-on electrical consumers at that instant. Said prediction can be updated at a regular interval, wherein said regular interval is preferably shorter than the currently displayed predicted duration. In particular, if the user switches off switched-on consumers or switches on further consumers, an updated prediction can be displayed, which updated prediction is based on the power supplied, at the instant of said consumer activation by the user, to the electrical consumers which are switched on at that time.

Thus, it can be displayed on a display to the user how long from a particular instant the electrical consumer or a group of electrical consumers are still utilizable if the utilization setting of the electrical consumer or the electrical consumers at that particular instant is maintained.

In addition, in the event of a critical energy state, the user can be prompted to start the internal combustion engine.

After the internal, combustion engine of the vehicle has been started, a generator which is mechanically coupled to the internal combustion engine can provide an additional coverage amount of electrical power.

The invention is based on the considerations set out below:

The prior art describes a conventional terminal concept of a vehicle, that is to say a switched power supply, by actuation of a start-stop key, and the further development of said concept with supply modes "park" and "drive" which are not directly switchable but can be automatically switched by the power supply system. This offers the user no comprehensible effects on the energy availability in the vehicle onboard power supply system during said modes.

Owing to the incomprehensible effects on the energy availability, the system is configured or dimensioned for an assumed worst-case utilization scenario.

It is proposed to make available the state of the onboard power supply system based on the energy availability, the state control for the availability of function and to introduce the supply mode "in-cab state". In this case, the vehicle is used, for example, to listen to the radio, without the vehicle being under way. By way of example, the availability of function for "park", "standard in-cab state" and "comfort in-cab state" and the state transfers are on the basis of availability criteria. For example, a first availability criterion corresponds to an energy threshold of the starting capability of the engine or vehicle. A second availability criterion corresponds to extended energy availability. It may be possible, with the help of the energy availability, to divide the "in-cab state" into substates such as "comfort in-cab state" and "standard in-cab state", for example. "Comfort in-cab state" means a higher availability of function for the user of, for example, a heated seat or passenger-compartment air-conditioning system. The restriction of said functions such as these by the transition to "standard in-cab state" results in conservation of the energy store (for example, the battery). This can be displayed to the user, for example as state display on the basis of the energy availability as a bar or pointer. This display also includes an energy-related state transition "in-cab state" to "park", which corresponds to an energy-related disconnection of the customer functions to ensure the starting capability of the vehicle.

Furthermore, the stepwise procedure offers the possibility, when restricting the customer functions, of bringing the systems in question into states which are optimized in terms of energy in a stepwise manner, too, or operating them there. The restriction of the dynamics to restrict the energy requirement can be mentioned as an example here.

In the event that an additional energy source, such as a range extender in the case of electric vehicles, for example, or an auxiliary heater with electrical energy generation using thermoelectric generator, is available, this can be deliberately activated by the customer requirement "comfort in-cab state." Further, additional energy sources can be a solar module or a solar roof, but also the connection to an external energy source by cable or a contactlessly connectable energy source using, for example, inductive energy transfer.

With the degree of availability of function of the "comfort in-cab state", the operating strategy in terms of energy is adapted and the "comfort in-cab state" functions can be experienced/utilized more often. An expansion stage consists in increasing the size of the energy store (that is to say, for example, the battery), for example in connection with a variant having special accessories.

In the case of this concept, it is advantageous that, by making the utilization more flexible, a higher degree of utilization and better availability of function of the system by the user is involved. Furthermore, the concept can be implemented in a cost-effective manner in the form of software in the vehicle. From the point of view of the customer, the transparency of the function delivery is noticeably increased.

BRIEF DESCRIPTION OF THE DRAWINGS

A preferred embodiment of the invention is described below on the basis of the appended drawing. Further details, preferred embodiments and developments of the invention emerge therefrom. In detail:

FIG. 1 schematically shows a display of an energy status of a vehicle onboard power supply system in the "in-cab state".

DETAILED DESCRIPTION OF THE DRAWINGS

FIG. 1 shows the display of a combi-instrument (1) of a vehicle from the point of view of the driver. A display such as this can also be integrated in a head-up display or in a head unit of a vehicle. The display can moreover be accompanied by audible elements and/or haptic elements.

An essential feature of the display is the activation thereof when the internal combustion engine of the vehicle is stationary or when the internal combustion engine is operated at a low rotational speed of the vehicle. This state of the vehicle is referred to as "in-cab state" and differs noticeably from a parked vehicle. A parked vehicle is not used at the moment of being parked. A vehicle in the "in-cab state" is a vehicle which is being used without movement of the vehicle in the form of a driving operation. This means that the state of the vehicle at a red light during a journey is to be referred to as belonging to the driving operation.

The "in-cab state" is characterized by an engine at a standstill or by an engine running at a low rotational speed while the vehicle is stationary. As an example, a person who waits for a relatively long time in a stationary vehicle operates the vehicle in the "in-cab state", for example.

According to another embodiment of the invention, the "in-cab state" can be extended to a vehicle with an engine which is running at a low rotational speed and movement of the vehicle under a limit speed. This may occur, for example, in the event of changing the location by a short rolling travel of the vehicle when there is a person waiting for a relatively long time in the vehicle.

In the "in-cab state", electrical consumers in the vehicle are activatable. The operation of electrical consumers requires a large amount of energy. The consumers are supplied with electrical power via energy sources in the vehicle which are possibly able to output power without the internal combustion engine being operated. As examples, a charged electrical energy store, such as a lead-acid battery, for example, or a lithium-ion battery can be specified, for example. A thermoelectric generator can also be used in the vehicle, which converts waste heat from the exhaust system into electrical energy, or a solar module on the roof of the vehicle, which solar module converts electromagnetic energy into electrical energy.

The display in FIG. 1 displays an energy status of the components outputting electrical energy in the "in-cab state" in a scaled manner in the form of an energy display (2) on a time-dependent basis.

According to another embodiment, in FIG. 1, a duration in the form of a duration display (3) can additionally be displayed, which display displays, in the form of a prediction, how long from the present moment the consumers which are currently activated are expected to be utilizable while maintaining the settings thereof.

According to another variant of the invention, during the "in-cab state", the availability of an electrical consumer can be set by a control device. This means that electrical consumers can be disconnected or reduced by the control device during the "in-cab state." This disconnection leads to the disconnected consumer not being operable or utilizable by the user. The disconnection of the heated seat can be mentioned as an example. Attention should be paid to the fact that a heated seat which is disconnected is different to a heated seat which is switched off. A heated seat which is switched off can be switched on by the user. A heated seat which is disconnected cannot be switched on by the user. However, a disconnected heated seat can be activated again by the control device during the "in-cab state" in order make it possible for a user to switch on the heated seat. The latter is the case, for example, when a vehicle with a solar roof is increasingly exposed to solar radiation during the "in-cab state," with the result that the energy supply increases.

According to another variant of the invention, in the "in-cab state" it is additionally possible to display whether a particular electrical consumer is available in a particular moment of the "in-cab state." This display can be done visually, for example in the combi-instrument, the head unit or in the head-up display of the vehicle. Alternatively or in addition, an audible or haptic signal can be output if the user intends to switch on an electrical consumer which has been disconnected by the control device.

By means of these embodiments, a high degree of availability of as many electrical consumers in the vehicle as possible can be achieved. Furthermore, the availability of the electrical consumers is transparent to the user.

What is claimed is:

1. A vehicle with an internal combustion engine, with a physical onboard power supply system and with at least one electrical energy source, wherein electrical consumers are integrated in the physical onboard power supply system, wherein, when the internal combustion engine is switched off or when the internal combustion engine is running at a low rotational speed, each of the electrical consumers is assignable by a control device, on a time-dependent basis, to either a first group of electrical consumers or a second group of electrical consumers, wherein the assignment of an electrical consumer to either of the two groups can be displayed on a display screen to the user of the vehicle, an electrical consumer of the first group is at least partly able to be switched on and off by a user, an electrical consumer of the second group cannot be switched by a user, and an electrical consumer which is switched on at least partly can be supplied with electrical power from the at least one electrical energy source, wherein an energy state of the at least one electrical energy source can be displayed to the user on a time-dependent basis.

2. The vehicle as claimed in claim 1, wherein an energy state of the at least one electrical energy source or of the energy sources can be displayed to the user in the form of a predicted duration at an instant, and the prediction of the duration is based on the power supplied to the at least partly switched-on electrical consumers at that instant.

3. The vehicle as claimed in claim 1, wherein in the event of a critical energy state, the user can be promoted to start the internal combustion engine.

* * * * *